United States Patent [19]

Leimbach

[11] 4,445,527

[45] May 1, 1984

[54] VALVE EXTENSION

[75] Inventor: Richard C. Leimbach, Durham, N.C.

[73] Assignee: Eaton Corporation, Cleveland, Ohio

[21] Appl. No.: 399,065

[22] Filed: Jul. 16, 1982

[51] Int. Cl.³ .............................................. F16K 15/20
[52] U.S. Cl. ................................... 137/226; 137/115;
   137/231; 137/232
[58] Field of Search ............... 137/223, 224, 225, 226,
   137/230, 231, 232

[56] References Cited

U.S. PATENT DOCUMENTS

| | | | |
|---|---|---|---|
| 1,732,918 | 10/1929 | Sutton | 137/230 X |
| 1,738,621 | 12/1929 | Washington | 137/226 |
| 3,315,695 | 4/1967 | Boyer | 137/232 |
| 3,491,786 | 1/1970 | Crossman | 137/226 X |
| 3,994,312 | 11/1976 | Tanner | 137/226 |

*Primary Examiner*—Harold W. Weakley
*Attorney, Agent, or Firm*—C. H. Grace; F. M. Sajovec

[57] ABSTRACT

A tire valve extension (10) which includes a relief valve element (24) to limit the inflation pressure of the tire. The extension has a tubular body with an annular recess (36) formed therein to define an outer tube section (14) and an inner tube section (16). A spring loaded valve actuating pin (18) is received within the inner tube section, and the relief valve element is received within the recess. Ports (32) formed in the body intersect a channel (38) formed in the recess to define a relief flow path.

9 Claims, 3 Drawing Figures

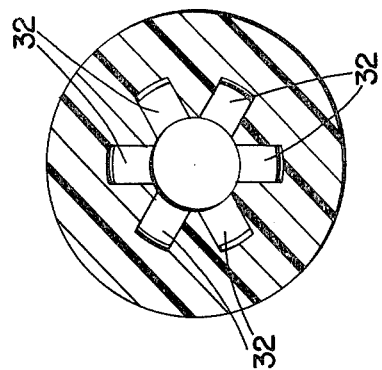
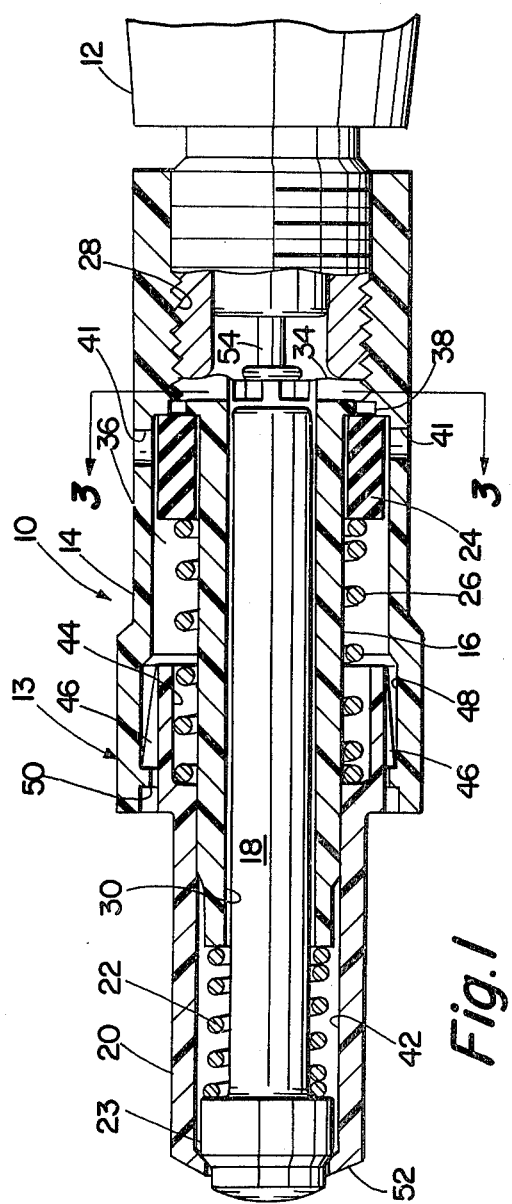
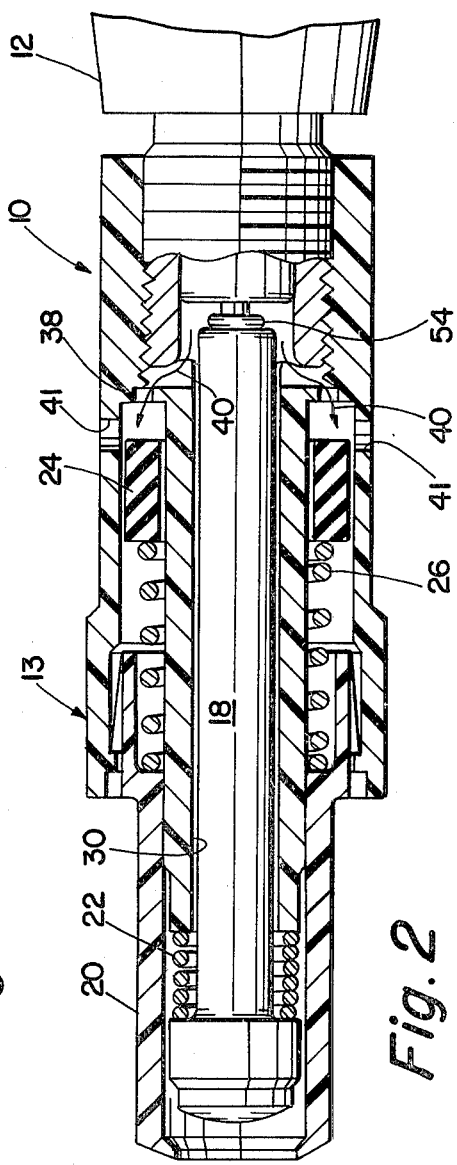

VALVE EXTENSION

The present invention relates to extensions adapted to be added to the valve stem of an automobile tire, and more particularly to a valve extension which includes a relief valve element.

In the interest of both safety and economy it is important that automobile and truck tires be uniformly inflated to an optimum pressure depending on the type of vehicle and the load being carried. As more and more filling stations are converted to self service or "mini service" operations, less attention is paid to the tire inflating facilities available to the public. As a result, it is difficult to locate a filling station which is equipped with a tire inflation facility with a working pressure regulator. Accordingly, tire pressure is often neglected and many cars are operated with underinflated tires causing reduced fuel mileage and increased and uneven tire wear.

What the present invention seeks to provide is a low-cost, easily-installed device which can be added to an existing tire valve assembly, which will limit the pressure to which the tire can be inflated to a predetermined value. It is thus expected that with the elimination of the uncertainty of the actual inflation pressure of his tires, a motorist will not be discouraged from frequently checking and inflating the tires of his vehicle to the pressures recommended by the manufacturer.

Prior art attempts to address this problem have included devices which bleed off some of the air applied by an air supply to limit the speed at which a tire can be inflated, and devices which also include filling valve elements and thus replace the existing valve assembly on the tire. These devices, however, either do not provide positive pressure relief, or they are too complicated and thus too costly to be readily marketable.

The present invention provides a valve stem extension of the type commonly used to extend the length of a standard valve stem for use on wheels having decorative covers, the valve stem extension also including a relief valve element. More specifically the valve stem extension of the invention includes a tubular body which screws onto a standard valve stem, a spring-loaded pin or plunger member which acts on the actuating pin of the existing valve core assembly within the stem, and a spring-loaded relief valve element which is designed to open a relief passage in the body to relieve pressure which is over a predetermined limit for that tire when the tire is being filled. The extension assembly includes a minimum number of separate parts, which are designed to snap together to ease assembly and thus minimize manufacturing costs.

Other objectives and advantages of the present invention will be apparent from the following description when considered in connection with the accompanying drawings, wherein:

FIG. 1 is a cross-sectional view of the invention shown in an unactuated position;

FIG. 2 is a view similar to FIG. 1, but showing the invention in an actuated position; and FIG. 3 is a sectional view taken at line 3—3 of FIG. 2.

Referring to the drawings, there is illustrated a tire valve extension 10 attached to a conventional tire valve stem 12. The extension 10 comprises a tubular body 13 threadedly engaged with the stem 12 and including an outer tube section 14 and an inner tube section 16, a pin 18 received in a bore formed through the inner tube, a retainer 20 received over the inner tube section and which is in "snap-in" engagement with the outer tube section, a first spring 22 acting between a head 23 formed on pin 18 and the end of inner tube 16, a seal element 24 received between the inner and outer tubes, and a second spring 26 acting between the seal element 24 and the retainer.

The tubular body 13 includes a first threaded bore 28 which is received on the stem 12, and a smaller through bore 30. As shown in FIG. 3, a plurality of radial slots 32 are formed in the surface of the wall 34 defined by the intersection of the bores 28 and 30.

A deep, annular recess 36 formed in the body 13 defines the inner and outer tube sections 14 and 16, and a further annular channel 38 is formed in the bottom of the recess 36, the channel 38 breaking through the outer ends of radial slots 32 to define air flow paths from the bore 28, through the slots 32, into the channel 38, and then into the recess 36 as shown by the arrows 40 in FIG. 2. A plurality of relief ports 41 are formed through the outer tube 14 to provide a flow path out of the recess 36 when the valve element 24 is in the relieving position shown in FIG. 2.

The retainer 20 is a tubular member having a first inner diameter 42 which defines a sliding fit with the outer diameter of the inner tube section 16, and a second, counterbore diameter 44 which forms a pocket to receive one end of spring 26. The outer diameter of the counterbored end is formed with a plurality of angled ribs 46, the maximum diameter of the ribs being slightly larger than the diameter of an enlarged diameter section 48 formed at the end of outer tube 14. An inwardly extending radial lip 50 is formed adjacent the open end of outer tube 14, and when the retainer 20 is slid over the inner tube the ribs 46 are compressed until they clear the lip 50, whereupon they expand outwardly against the diameter 48 and are locked in place behind the lip.

The outer end of retainer 20 is formed with an inwardly directed lip 52 which is engageable with the head 23 of pin 18.

The seal element 24 is a cylindrical member formed of an elastomeric material which is received in the bottom of recess 36 and is compressed by spring 26 to normally cover the channel 38 and thus block the flow of air from the stem 12 to the recess 36.

ASSEMBLY

The valve extension 10 is assembled by first inserting the seal element 24 and the spring 26 into the recess 36. The spring 22 is placed over the pin 18 and in engagement with the head 23, and the pin is inserted into the retainer 20 as shown in FIG. 1 so that the head 23 engages the lip 52. The retainer 20 is then slipped over the inner tube section 16, with the pin 18 being received within the bore 30. As the retainer is slid to the right onto the inner tube to the position shown in FIGS. 1 and 2, the spring 22 is compressed between the head 23 of the pin 18 and the end of the inner tube section 16, and the spring 26 is compressed between the retainer 20 and the seal element 24. Once the ribs 46 pass the lip 50, they become locked behind the lip to effect a permanent, substantially tamper-proof assembly ready to be threaded onto a tire valve stem assembly 12.

OPERATION

Normally, the valve extension will be in the position shown in FIG. 1, with the pin 18 biased slightly to maintain the head 23 in contact with the lip 52, and the seal element biased into engagement with the bottom of recess 36 to cover the channel 38, the preload on spring 26 being determined by the desired maximum pressure to be applied to the tire via valve stem assembly 12.

When it is desired to fill the tire or check the pressure within the tire, the pin 18 is depressed by the fill nozzle or pressure gauge to the position shown in FIG. 2 bringing the end of pin 18 into engagement with the actuating pin 54 of the valve core (not shown) of valve stem assembly 12, to open the tire valve, as is well known in the art. So long as the pressure within the tire does not exceed the set pressure as determined by the spring 26 acting on the seal element, the seal element will remain in the FIG. 1 position. However, when the set pressure is slightly exceeded, the seal element 24 will move to the position as shown in FIG. 2, opening the flow path denoted by the arrows 40 and allowing air to escape through relief ports 41 until the excess pressure is relieved, whereupon the seal element will return to its FIG. 1 position .

I claim:

1. An extension adapted for attachment to the valve stem assembly of a pneumatic tire comprising a housing having a longitudinal bore and an enlarged bore adjacent to one end thereof, threads formed in said enlarged bore for attachment to said valve stem, an elongated valve actuating member received in said elongated bore and engageable with said valve stem assembly, an annular recess formed in said housing coaxial with said longitudinal bore, a wall defined by the intersection of said longitudinal bore with said enlarged bore, one or more ports formed through said wall, a channel formed at the end of said recess and intersecting said one or more ports to define a flow path between said enlarged bore and said annular recess, a valve element received within said annular recess, and means received within said recess for biasing said valve element into a position closing said flow path.

2. Apparatus as claimed in claim 1 in which said valve element comprises a cylindrical member formed of an elastomeric material, said cylindrical member contacting the end of said recess and covering said channel under the influence of said biasing means.

3. Apparatus as claimed in claim 1 including a tubular retainer engaged with said housing, said biasing means comprising a compression spring acting between said valve element and said tubular retainer.

4. Apparatus as claimed in claim 3, in which said elongated valve actuating member comprises a pin having a head formed at one end thereof, said tubular retainer being received over said pin and having an inwardly directed lip formed at one end thereof, said lip retaining said pin within said tubular retainer.

5. Apparatus as claimed in claim 4, including a second compression spring received between said housing and the head of said pin, said second spring biasing said head into engagement with said inwardly directed lip.

6. Apparatus as claimed in claim 3 in which said annular recess defines an inner tube section of said housing and an outer tube section, said tubular retainer being received over said inner tube section with an end portion thereof received within said annular recess and said end portion having flexible outwardly extending ribs formed thereon engageable with an inwardly directed lip formed on said outer tube section within said annular recess.

7. An extension adapted for attachment to the valve stem assembly of a pneumatic tire comprising a housing having a longitudinal bore and an enlarged bore adjacent to one end thereof; threads formed in said enlarged bore for attachment to said valve stem; an elongated valve actuating member received in said elongated bore and engageable with said valve stem assembly; an annular recess formed in said housing coaxial with said longitudinal bore, said annular recess defining an inner tube section of said housing and an outer tube section; means defining a flow path between said enlarged bore and said annular recess; a valve element received within said annular recess; a tubular retainer received over said inner tube section with an end portion thereof received within said annular recess, said end portion having flexible outwardly extending ribs formed thereon engageable with an inwardly directed lip formed on said outer tube section within said annular recess; and a compression spring acting between said valve element and said tubular retainer to bias said valve element into a position closing said flow path.

8. Apparatus as claimed in claim 7, including a wall defined by the intersection of said longitudinal bore with said enlarged bore, said means defining a flow path comprising one or more ports formed through said wall and a channel formed at the end of said recess, said channel intersecting said one or more ports.

9. Apparatus as claimed in claim 7, including a plurality of exhaust ports formed through the outer wall of said outer tube section and opening into said annular recess.

* * * * *